Sept. 27, 1966  J. A. JIMENEZ ET AL  3,274,959
BUN DIVIDER AND ROUNDER
Filed Oct. 23, 1962  2 Sheets-Sheet 1
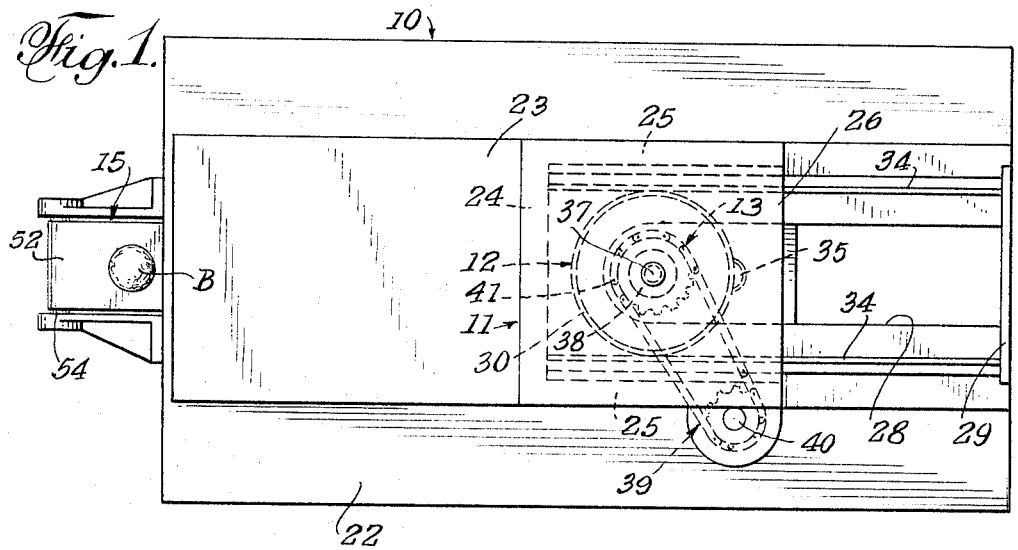
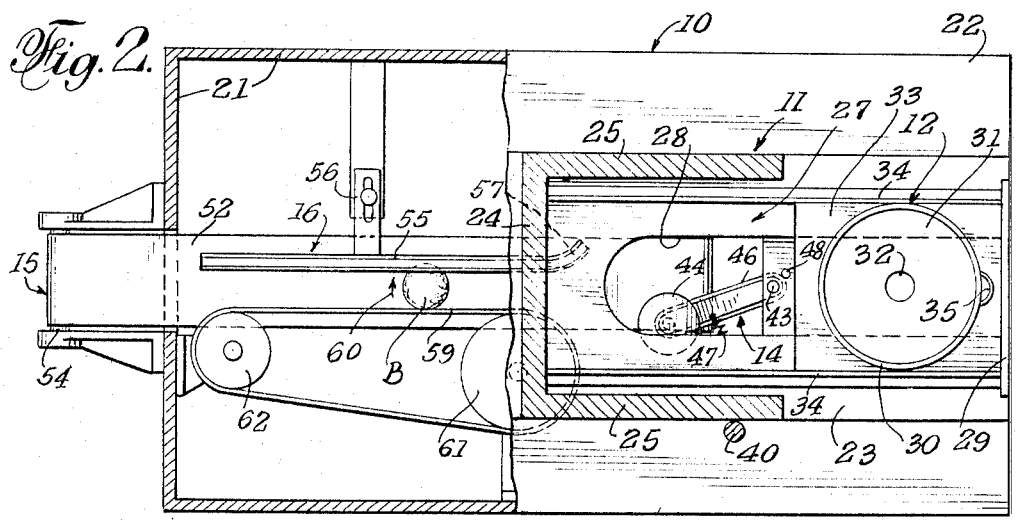
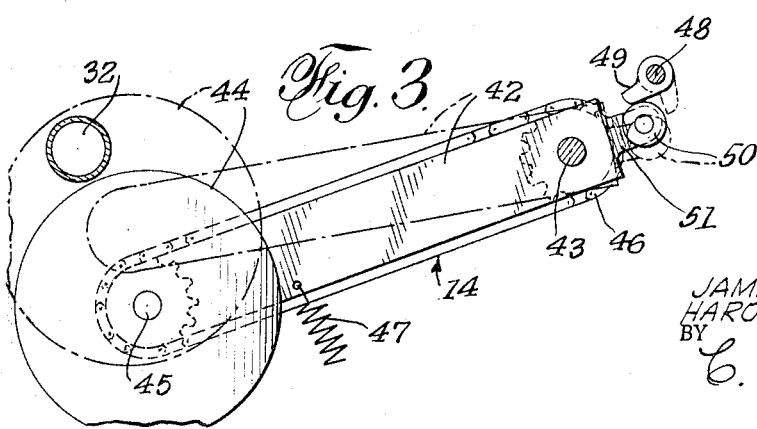
INVENTORS
JAMES A. JIMENEZ
HAROLD H. OLMSTED
BY
C. I. Stratton
ATTORNEY

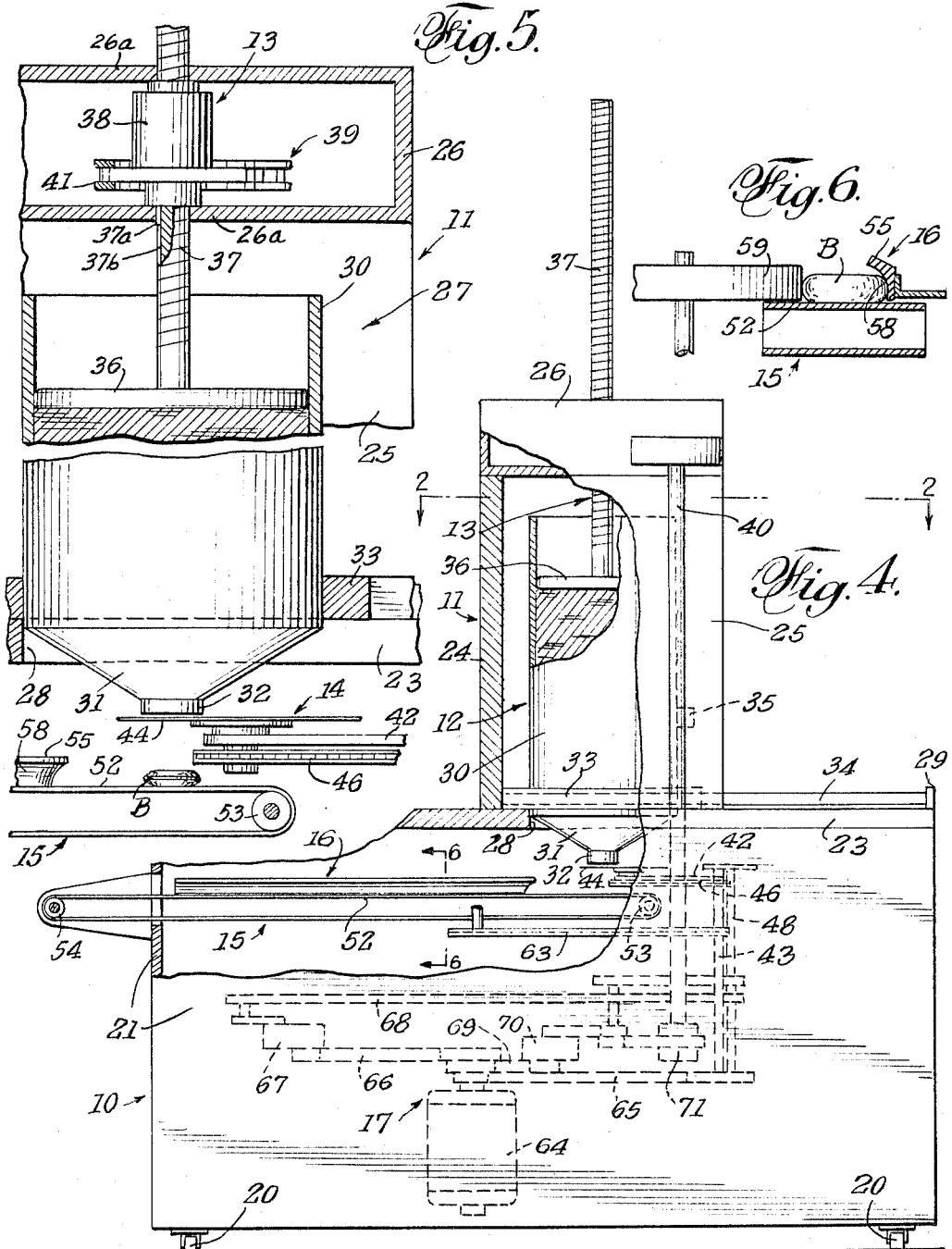

United States Patent Office 3,274,959
Patented Sept. 27, 1966

3,274,959
BUN DIVIDER AND ROUNDER
James A. Jimenez and Harold H. Olmsted, both of
6252 N. Hart Ave., Temple City, Calif.
Filed Oct. 23, 1962, Ser. No. 232,484
5 Claims. (Cl. 107—68)

This invention relates to a machine for forming batches of dough or buns from a mass of dough and rounding the periphery thereof. The buns thus provided are particularly adapted to be flattened into thin sheets to form tortillas with smooth, unbroken peripheral edges.

An object of the invention is to provide a bun divider and rounder that sequentially cuts buns and rounds the peripheries thereof without intermediate handling.

Another object of the invention is to provide a machine of the character referred to that is compact and is adapted for easy portability from place to place and produces rounded balls or batches of dough in a rapid and facile manner.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a plan view of a bun divider and rounder according to the present invention.

FIG. 2 is a plan sectional view as taken on the plane of line 2—2 of FIG. 4.

FIG. 3 is an enlarged plan view of dough-slicing means used in the invention to divide buns from a mass of dough being forced through a discharge orifice.

FIG. 4, to the scale of FIGS. 1 and 2, is a side elevational view of the machine, parts being shown in vertical section and parts being broken away.

FIG. 5 is a partly broken and partly sectional view, to the scale of FIG. 3, showing dough-feeding and slicing components of the machine.

FIG. 6 is a cross-sectional view as taken on the line 6—6 of FIG. 4.

The bun divider and rounder that is illustrated comprises, generally, a base housing 10, an upper housing extension 11 on the housing 10, a dough container 12 movable on the base housing between an operative position within the housing extension and filling position outside of said extension, means 13 for extruding dough from the container 12, means 14 to slice through dough thus extruded to form a bun B (FIG. 5), a conveyor 15 upon which said bun falls and for conveying the same to a point or place of discharge from the machine, means 16 to round the periphery of said bun B while the same is so moving, and means 17 for driving and operating the means 13, 14 and 16.

The base housing 10 is shown as supported on caster wheels 20 so the same may be moved from place to place as desired. Said base housing, may, of course, be fixed, if portability is not required. Said housing 10 is formed as a parallelepiped having side and end walls 21 and a top wall 22. As will be explained, said housing encloses the slicing means 14, all except the discharge end of the conveyor 15, the bun-rounding means 16 and the driving and operating means 17.

The housing extension 11 is mounted on a platform 23 disposed along the middle of the top wall 22 of the base housing. Said extension comprises an interiorly hollow housing having a front wall 24, side walls 25, and a top housing 26 for the means 13. Said extension 11 is disposed intermediate the ends of the base housing 10, the interior space 27 thereof being open opposite the wall 24. As best seen in FIG. 2, the platform 23 is provided with a slot 28 that extends from the center of the housing extension 11, past the open side of said extension to the end of the base housing. A stop projection 29 is provided at said housing end.

The dough container 12 is shown as a top-open vessel 30 with a conical bottom 31 that is provided with a central discharge orifice 32. A rectangular support flange 33 is affixed to said vessel and has sliding engagement along the platform 23. The side edges of said flange are guided between a pair of tracks 34. Said vessel 30 has its bottom 31 extending into the slot 28 so that the vessel may be moved between the operating position centered in the housing extension 11, as in FIGS. 1, 4 and 5, through the open end of said housing extension, to a dough-filling position, as in FIG. 2, wherein the open top of the vessel is clear of the top 26 of the extension. A handle 35 on vessel 30 facilitates movement thereof. The dough-loading position of the container 12 need not be locked but the operating position may be locked or latched, in any suitable manner, to ensure centering of the vessel on the axis of the means 13.

The dough-extruding means 13 is shown as a piston 36 to slidingly fit the vessel 30, a threaded stem 37 extending upwardly from said piston through the housing 26, the same having sliding movement but being held against rotation in said housing by a key 37a engaged in a slot 37b in the stem 37, a nut 38 engaged with said stem and held fixed against endwise movement by the top and bottom walls 26a of housing 26, and means 39 to rotate said nut in one direction or the other to thereby cause the stem to extend or retract, lowering and raising the piston accordingly. To minimize operation friction, the stem may be of the type known as a Saginaw screw with the nut 38 engaging the same through anti-friction balls.

The nut-rotating means is shown as a driven shaft 40 that extends into the base housing 10, and a chain and sprocket drive connection 41 between said shaft and the nut 38.

In the fully retracted position of the stem 37, the piston 36 is raised clear of the top of the vessel 30, freeing the latter for movement to dough-loading position. As the stem is downwardly projected, the piston causes dough in the vessel 30 to extrude through the orifice 32. The means 14 slices through dough thus extruded to form the buns B.

Said means 14 is shown as an arm 42 that is swingable on a continuously rotating shaft 43 disposed vertically in the base housing 10, a slicing disc 44, on the free end of said arm, on an axis 45 parallel to the shaft 43, and a chain and sprocket drive connection 46 between said shaft 43 and disc 44 is provided to continuously rotate said disc. The arm 42 is normally biased, as by a spring 47, in a direction to withdraw the cutting edge of the disc 44 to a position clear of the orifice 32, as shown in the full line position of FIG. 3. The arm and disc are swung around the axis of shaft 43 to the dot-dash line position of FIG. 3 wherein the periphery of the disc is moved along a path beneath the orifice to slice through dough that is extruded therefrom. This movement is accomplished by a rotational shaft 48 provided with a dog 49 that engages a cam roller 50 on an extension 51 on arm 42. Each time the dog 49 engages the roller 50, the disc 44 is moved in a direction to slice through extruding dough. The arm and disc are retracted by the spring 47 against a suitable abutment when the dog 49 leaves the roller 50. In the time it takes the dog to again pick up the roller 50, dough is being extruded so the next slicing operation may be carried out. Buns B are thus sliced from the dough intermittently.

The conveyor 15 is shown as an endless belt 52 that is horizontally disposed so that the buns B may fall upon the upper run thereof. Said belt may be continuously driven by means not shown, in any suitable manner. The belt spans between rollers 53 and 54. The drive for the belt may be applied to either of said rollers.

The buns, as they are when sliced, ordinarily have an uneven peripheral edge that, moreover, is frequently different from one bun to another. Such a bun will not provide a satisfactorialy even outer periphery when flattened into a tortilla. The bun rounding means 16 provides the buns, before their discharge from conveyor 15, with uniformly rounded peripheries, as suggested in FIG. 6. To this end, the means 16 is shown as comprising an edge-rounding or forming strip 55 that is carried by an adjusting bracket 56 to be longitudinally disposed in close proximity to the top run of the belt 52. The buns that fall onto said conveyor run are guided by a flared end 57 of the strip 55 into peripheral engagement with the forming face 58 of said strip.

The means 16 further comprises an endless drive band 59 that has a run parallel to the strip 55, is in contact with the buns, and is driven in a direction to impart rotation to the buns, according to the arrow 60. Said band 59 is trained around pulleys 61 and 62, the former being driven, as by a chain and sprocket drive connection 63 from the shaft 40 or in any other suitable manner. It will be clear that the buns are rotated bodily to cause rounding of the peripheries thereof by means of the forming face 58. When the buns pass beyond the end of forming strip 16, the conveyor belt 52 moves them toward discharge, as to a flattener that converts the buns into tortillas.

The drive means 17 is shown in a general manner, since the same may be varied in many ways. In this case, a single motor 64 constitutes the prime mover for all of the machine components and may drive the conveyor 15 also. A belt drive 65 is shown as directly driving shaft 43 so that the slicing disc 44 spins at a continuous rate. A belt 66, through a vari-drive unit 67, drives a chain and sprocket connection 68 to the shaft 48, thus enabling adjustment of the rotation rate of the dog 49. A belt 69, through a vari-drive unit 70 and a reversing clutch 71, drives the shaft 40. With the clutch set in one position, the shaft 40 will rotate in one direction, and when set in the other position, said shaft will rotate in the opposite direction. Whenever the same are needed for great speed reduction, as when rotating shaft 40, for instance, a suitable speed reducer may be used. It will be noted that one vari-drive unit controls slicing speed while the other controls dough feed through the orifice to afford the relationship of slice to feed, as desired.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A bun divider and rounder comprising
   (a) a base housing having a support top,
   (b) a dough container having a lower discharge opening, mounted on and movable on said support top between an operative position and a dough-filling position,
   (c) a housing extension on the base housing located to house the dough container when in operative position,
   (d) means mounted in the housing extension to apply dough-extruding pressure on the dough in the container in said operative position of the container,
   (e) means including a rotary slicer to cut through dough extruded from the discharge opening of the container to form a bun divided from said dough,
   (f) a conveyor to receive the bun of dough thus divided and to transport the same away from the discharge opening of the container, and
   (g) means for engaging the periphery of the bun, while so transported, to round the same.

2. A bun divider and rounder according to claim 1 in which the means to apply pressure to the dough comprises
   (a) a piston slidingly fitted in the container,
   (b) a non-rotational stem on said piston,
   (c) a fixedly positioned rotational nut engaged with the stem, and
   (d) means to rotate said nut to cause longitudinal movement of the stem in a direction to force the piston to place pressure on the dough in the container.

3. A bun divider and rounder according to claim 1 in which the bun-rounding means comprises
   (a) an endless band disposed above the mentioned conveyor for engaging the peripheries of buns being transported by said conveyor,
   (b) means to move said band to rotate the buns while the same are being transported, and
   (c) an edge-rounding strip parallel and opposite the band and provided with a bun-rounding surface in engagement with the rotating buns.

4. A bun divider and rounder comprising
   (a) a dough container having a discharge opening,
   (b) means to apply pressure to the dough to force a portion thereof to project through said opening,
   (c) means to slice through said projected portion of dough to divide the same from the dough in the container,
   (d) a conveyor to receive the bun of dough thus divided and to transport the same away from the discharge opening of the container,
   (e) means for engaging the periphery of the bun, while so transported, to round the same, and
   (f) means to mount said dough container for movement between an operative position engaged with the means to apply pressure on the dough and associated with the slicing means, and a dough-loading position offset from the operative position.

5. A bun divider and rounder comprising
   (a) a dough container having a discharge opening,
   (b) means to apply pressure to the dough to force a portion thereof to project through said opening,
   (c) means to slice althrough said projected portion of dough to divide the same from the dough in the container,
   (d) a conveyor to receive the bun of dough thus divided and to transport the same away from the discharge opening of the container,
   (e) means for engaging the periphery of the bun, while so transported, to round the same,
   (f) and comprising an endless band disposed above the mentioned conveyor for engaging the peripheries of buns being transported by said conveyor, (g) means to move said band to rotate the buns while the same are being transported, and (h) an edge-rounding strip parallel and opposite the band and provided with a bun-rounding surface for engagement with the rotating buns.

References Cited by the Examiner

UNITED STATES PATENTS

| | | | |
|---|---|---|---|
| 650,841 | 6/1900 | Heilman | 107—13 |
| 1,126,606 | 1/1915 | Wolf. | |
| 1,466,509 | 8/1923 | Laskey | 107—14.2 X |
| 2,747,524 | 5/1956 | Groff | 107—9 |
| 2,867,000 | 1/1959 | Huszar. | |

FOREIGN PATENTS 460,807  6/1928  Germany.

ROBERT E. PULFREY, *Primary Examiner.*

J. D. BEIN, *Examiner.*